United States Patent [19]

Bachelard et al.

[11] Patent Number: 5,378,666
[45] Date of Patent: Jan. 3, 1995

[54] PRODUCTION OF WHISKER-FREE SI$_3$N$_4$ PARTICULATES BY CARBONITRIDING SIO$_2$

[75] Inventors: Roland Bachelard, Lyons; Jean-Pierre Disson, Voiron, both of France

[73] Assignee: Elf Atochem S.A., Puteaux, France

[21] Appl. No.: 907,546

[22] Filed: Jul. 2, 1992

[30] Foreign Application Priority Data

Jul. 2, 1991 [FR] France .................. 91/08221

[51] Int. Cl.$^6$ .................. C04B 35/58; C01B 21/068
[52] U.S. Cl. .................. 501/97; 423/344
[58] Field of Search .................. 501/97; 403/344

[56] References Cited

U.S. PATENT DOCUMENTS

| | | | |
|---|---|---|---|
| 4,428,916 | 1/1984 | Komeya et al. | 423/344 |
| 4,514,370 | 4/1985 | Inoue et al. | 423/344 |
| 4,986,972 | 1/1991 | Ishii et al. | 423/344 |
| 5,075,091 | 12/1991 | Schönfelder et al. | 423/344 |

*Primary Examiner*—Karl Group
*Attorney, Agent, or Firm*—Burns, Doane, Swecker & Mathis

[57] ABSTRACT

Whisker-free particulates of silicon nitride (Si$_3$N$_4$), e.g., spheres, beads, or a variety of other shaped articles exhibiting a regular and controlled particle size, are produced by incorporating a primary reaction mixture of silica and carbon into a porous, carbon-based matrix material, next carbonitriding the composite thus formed, and characteristically eliminating excess carbon from the carbonitrided composite.

14 Claims, 1 Drawing Sheet

PRODUCTION OF WHISKER-FREE SI3N4 PARTICULATES BY CARBONITRIDING SIO2

BACKGROUND OF THE INVENTION

1. Field of the Invention:

The present invention relates to the production of whisker-free silicon nitride ($Si_3N_4$) shaped articles by the carbonitriding of silica ($SiO_2$).

2. Description of the Prior Art:

Silicon nitride is a member of that class of ceramics deemed "technical" materials. By reason of a unique combination of particular properties, it is a candidate of choice for producing articles which must retain their properties up to high temperatures (1,000° to 1,200° C.). These products can thus be used for the manufacture of carburetor plates, of rotors for turbo-compressors, and of precombustion chambers for diesel motors in the automotive industry, in particular because of high mechanical resistance, high temperature resistance, and its resistance to thermal shock and wear. It is equally useful for the manufacture of ball bearings, notably because of its low coefficient of friction and its resistance to wear, and also for the manufacture of pulverization tubes, extrusion plates, cutting tools, again due to its high durability and its resistance to wear.

Typically, shaped articles of silicon nitride are produced by high temperature sintering, under a nitrogen atmosphere, of a silicon nitride powder to which a densifying additive is added.

Currently, silicon nitride is itself prepared, on an industrial scale, according to one of the following mechanisms:

(1) Direct nitriding of silicon:

$$3Si + 2N_2 \rightarrow Si_3N_4$$

The reaction is very exothermic and difficult to control and coarse powders are produced which must be ground into a fine powder, which is often present in the form of very angular grains;

(2) Decomposition of a silicon polyimide, for example according to the following mechanisms:

$$3Si(NH)_2 \rightarrow Si_3N_4 + 2NH_3$$

$$3Si(NH_2)_4 \rightarrow Si_3N_4 + 8NH_3$$

Such reactions produce a very fine but amorphous powder, which is then suitably crystallized at a temperature of from 1,300° to 1,500° C. in order to provide a powder well adopted for sintering.

Another process (3) for the synthesis of $Si_3N_4$ entails the carboreduction or carbonitriding of silica ($3SiO_2 + 6C + 2N_2 \rightarrow Si_3N_4 + 6CO$), which is of interest because it requires only inexpensive starting materials. It is, however, inconvenient and rarely proceeds to completion (due to difficulties in attacking the last grains of silica). Also, such reaction must not be conducted at more than about 1,500° C., to avoid forming SiC. This reaction produces a gaseous intermediate of silicon, of the species SiO, this species being capable of reacting, in gaseous phase ($3SiO + 3CO + 2N_2 \rightarrow Si_3N_4 + 3CO_2$), to produce $Si_3N_4$ in a state which is no longer spherical, but rather in the form of whiskers. In the absence of this type of reaction, the SiO can be entrained and transported by nitrogen to the colder zones of the apparatus (about 1,000° C.) and can be decomposed, thereby promoting fouling.

The control of the geometry of the grains, inter alia to avoid the formation of whiskers, and the formulation of a reaction mixture starting material are well described in the literature, patent and otherwise. For example:

FR-A-2,388,763 describes adding 5% to 50% by weight of a powder of $Si_3N_4$ to a mixture of carbon and silica (beginning of crystallization, with a goal of rapidly producing a fine powder of $Si_3N_4$);

EP-A-82,343 describes adding at least 50% of an initial $Si_3N_4$ charge to itself provide for the carbonitriding and suffices to produce a fine and geometrically controlled powder;

JP-61/174,106 describes preparing a fine powder of $Si_3N_4$ by means of a starting material selected from among SiC, $Si_3N_4$, AlN, TiN, and TiC;

JP-63/176,301 and JP-63/239,104 describe the addition of an initial charge of $\beta$-$Si_3N_4$, thereby producing a powder rich in $\beta$-$Si_3N_4$ and poor in $\alpha$-$Si_3N_4$;

EP-A-131,894 describes incorporating a mixture of $SiO_2$/C, an initial crystallization charge ($\alpha$-$Si_3N_4$) and an additive selected from among the compounds of Mg, Be, Ca, Sr, Ge, Sn, Ti, Hf, Zr, thereby preparing powders which are fine and rich in $\alpha$-$Si_3N_4$;

NL-88/02,117 describes the formation of particulates having a density less than 0.8 g/cm$^3$ and an increased reactivity;

DE-3,612,162 and JP-63/319,204 describe granulating the primary materials and fluidizing same by means of nitrogen (the '204 patent).

Indeed, even if the aforesaid various techniques improve or control the discharge or loss of silicon compounds or the size of the grains, it has not to date been possible, at the same time, to limit such losses of silicon compounds and control the particle size of the grains employing a simple reaction mixture.

SUMMARY OF THE INVENTION

Accordingly, a major object of the present invention is the provision of an improved process for the production of $Si_3N_4$ by carbonitriding silica, this process permitting, at the same time, the control of the size and the form of the particles of $Si_3N_4$ and avoiding losses of silicon compound without in any way reducing the speed of the reaction.

Another object of this invention is the production of regularly shaped particulates of $Si_3N_4$ which are devoid of whiskers.

Briefly, the present invention features the production of whisker-free $Si_3N_4$ particulates, comprising:

(i) forming a primary reaction mixture from carbon and silica;

(ii) incorporating such primary reaction mixture into a porous, carbon-based matrix;

(iii) carbonitriding the resulting step (ii) product and recovering $Si_3N_4$; and, optionally, (iv) eliminating the excess carbon therefrom.

DETAILED DESCRIPTION OF THE PREFERRED EMBODIMENTS OF THE INVENTION

Figure 1A:
FIGS. 1A and 1B are (3×) magnifications of the products of example 1.

More particularly according to the present invention, the first step of the subject process comprises forming the primary reaction mixture.

By the term "silica" is intended silica itself, $SiO_2$, or a precursor of silica, such as an alkoxide, alkyl or alkylhalide of silica, or a fluorosilicic acid, and quartz. The carbon can be employed in the form of carbon black, namely, a wide variety of carbon blacks, such as vegetable carbon, acetylene black, thermal carbon blacks, lamp black, graphite, coke, etc.

The carbon participating in the reaction can equally provide a substance capable of generating carbon over the course of the reaction. Such a carbon-forming or precursor substance notably comprises a thermally hardenable binder such as a phenolic resin, notably a phenol/formol resin, an epoxy resin, polyimide, polyurea, or polycarbonate. It will of course be appreciated that a mixture of carbon black and carbon precursors can be used.

In the primary reaction mixture, the molar ratio of total carbon (i.e., carbon black and/or precursor thereof, expressed in C) to silica (C/Si) typically ranges from 1 to 20 and preferably from 1.5 to 8.

To the above essential components, there is optionally added an initial or seed crystallization charge, such as, for example, a powder of $Si_3N_4$. Typically, the amount by weight of such additive does not exceed 40% (as compared to silica).

There can also be added to the reaction mixture an additive selected from among the compounds of Mg, Ca, Fe, Si, Ti and Zr to promote crystallization to α-$Si_3N_4$, to accelerate the reaction and trap SiO, these additives typically being incorporated in amounts ranging from 0.3% to 10% by weight, relative to the silica.

In a preferred embodiment of the reaction, water or an organic solvent can be added to the above constituents.

The primary reaction mixture can be granulated, extruded, pelletized and, more generally, shaped into any form whatsoever. It can also, as a function of the different additives and diluents/solvents employed, be dried or not.

The second step of the process of the invention entails the recovery of the primary reaction mixture to incorporate same into the porous, carbon-based matrix.

This porous matrix is advantageously formed from a secondary mixture including one or more carbon blacks and/or a coke-forming precursor, as indicated above.

It will be appreciated that, in the second step of the subject process, as in the first, the carbon is present in the form of a powder having a granulometry (Sedigraph) advantageously ranging from 0.5 to 5 microns, the size of the elemental grains of which (transmission electron microscope) being less than 50 nm. The granulometry (Sedigraph) of the silica of the first step can range from 0.2 to 3 microns, and the size of the elementary grains (transmission electron microscope) is advantageously less than 30 nm.

It too will be appreciated that the mixture destined to constitute the porous matrix of the second step can include certain crystalline charges (for example in an amount of 1% to 30% by weight relative to the total amount of C), or additives promoting the transformation of the SiO into $Si_3N_4$ (for example an amount of 0.5% to 80% by weight of total C), the various additives and charges advantageously being selected from among those materials described above.

Similarly, the mixture of the second step can contain water or an organic solvent.

The incorporation of the primary reaction mixture into the above porous matrix can be carried out in a variety of different ways. As in the technique described previously, the primary mixture can be presented in whatever form, following grinding, granulation, extrusion, or pelleting. In this manner, the secondary mixture can be sprayed onto the granulates (term utilized for purposes of simplicity) of the primary mixture. The secondary mixture can also be added to the granules of the primary mixture, by rotation in a granulator assembly. Any coating process known to this art is thus applicable.

A third mixture can also be obtained by recovering the mixture of primary granules and of the secondary mixture. Such secondary mixture thus provides a third mixture which can be subjected to the carbonitriding reaction, or can, preliminarily, be converted into a wide variety of shaped articles, for example, by extrusion, pelleting, tabletting, casting, etc.

The third step of the process of the invention comprises subjecting the resulting products of the second step to a carbonitriding reaction. In general, this reaction is conducted by heating the mixture in a gaseous flowstream containing nitrogen (for example nitrogen or $NH_3$ and, optionally, inert gases such as argon, helium, or a minor amount of carbon monoxide or hydrogen), typically at atmospheric pressure and at a temperature advantageously ranging from 1,300° to 1,550° C. and preferably from 1,400° to 1,500° C.

The process of the invention thus permits the production of $Si_3N_4$ in the form of particles of controlled size and shape, excluding whiskers, and provides the advantage, among others, of avoiding the release of silicon compounds without otherwise reducing the speed of the reaction.

According to techniques well known to this art, the excess carbon can be eliminated, for example by combustion in air at a temperature in excess of 500° C.

In order to further illustrate the present invention and the advantages thereof, the following specific examples are given, it being understood that same are intended only as illustrative and in nowise limitative.

EXAMPLE 1

Primary Starting Materials (i) Silica of average granulometry: 1.7 μm (Sedigraph) and of elementary grain diameter 5 nm.

(ii) Acetylene black of average granulometry: 4.5 μm (Sedigraph) and of elementary grain diameter 35 nm.

(iii) A phenol/formol resin in aqueous solution (concentration 60%).

720 g of the silica, 216 g of the acetylene black, 760 g of the phenol/formol resin and 550 g of water were intimately admixed in a Z handmixer in such manner as to provide a primary mixture.

This mixture was extruded to produce whiskers 4 mm in diameter and from 3 to 15 mm in length.

These whiskers were placed on the faceplate of a granulation apparatus rotating at 750 t/mn. The extrudate was thus converted into spheres or beads having a diameter from 2 to 6 mm.

A portion of the charge was removed from the granulator and dried at 150° C. (Fraction A). The other portion was retained in the granulator, the speed of rotation of which was adjusted to 250 t/mn.

Then introduced into the granulator were 130 g of acetylene black, a material which was deposited onto the spheres to totally coat the surfaces thereof. These spheres (Fraction B) were removed from the granulator and dried at 150° C.

28 g of the spheres A or B were then placed into a graphite crucible and treated with a flowstream of nitrogen at the rate of 34 l/h and according to the thermal cycle:
(a) 1 hour at 1,250° C.;
(b) 2 hours, during which the temperature was progressively increased from 1,250° C. to 1,450° C.;
(c) 7 hours at 1,450° C.

The extent of transformation of the $SiO_2$ into $Si_3N_4$, determined chromatographically via the amount of CO evolved in comparison with the accumulated volume recalculated by means of the theoretical volume, ranged from 93% for the spheres B to from 91% for the spheres A.

Figure 1B:

In this manner, as is apparent from FIGS. 1A and 1B (3×), the spheres B (after coating with carbon) exhibited a surface area which was quasi-devoid of whiskers, even though the spheres A were practically recovered from whiskers (white portions).

EXAMPLE 2

60 g of silica (from Example 1), 6 g of $Si_3N_4$ (particles of average granulometry: 0.9 μm granulometry Sedigraph), 65 g of phenol/formol resin (Example 1), and 20 g of water were mixed in a Z handmixer for 1 hour. This mixture was extruded to a diameter of 2 mm and dried at 150° C. to produce the primary granules. The secondary mixture was obtained by mixing 36 g of acetylene black (Example 1), 40 g of phenol/formol resin (Example 1) and 70 g of water for 1 hour.

A fresh mixture of 75 g of the secondary mixture with 44 g of the primary granules was then produced (1 hour malaxation in the Z-mixer) and provided complete incorporation of the primary granules into the secondary mixture.

The final mixture was extruded into the form of granules 1 cm in diameter, these granules being dried at 150° C.

16.2 g of these granules were carbonitrided under the following conditions:
Flowstream of 35 l/h of nitrogen;
Thermal cycle of:
(a) 1 hour at 1,250° C.;
(b) 2 hours at 1,250° C. to 1,470° C.;
(c) 3 hours at 1,470° C.

Figure 2:
FIG. 2 is a (3×) magnification of the product of example 2.

The extent of transformation of the $SiO_2$ into $Si_3N_4$ (determined as in Example 1) was greater than 99%. The granulates were devoid of all whiskers (FIG. 2 - 3×), and no deposit resulting from the decomposition of SiO was observed on the cold regions of the carbonitriding oven.

After treatment at 650° C. with air to eliminate the excess carbon, a fine powder of silicon nitride was obtained having a specific surface area (BET) of 25 m2/g.

EXAMPLE 3

30 g of the spheres A prepared as described in Example 1 were introduced into a rotary evaporator in the presence of the components of the secondary mixture: 50 g of methanol, 9 g of water, 5 g of phenol/formol resin and 15 g of $CaCl_2$. After evaporation at 150° C., spheres coated with the secondary mixture were obtained.

17 g of these spheres were treated under the conditions of Example 1. The calculated extent or degree of transformation was 98%. The granules were completely devoid of whiskers and no deposit of the product attributable to the decomposition of SiO was determined.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of whisker-free particulates of silicon nitride, comprising forming a primary reaction mixture including silica and carbon, incorporating said primary mixture into a carbon-based matrix material composite, and thence carbonitriding the composite thus formed to produce said particulates.

2. The process as defined by claim 1, further comprising eliminating excess carbon from said carbonitrided composites.

3. The process as defined by claim 1, wherein the carbon included in said primary reaction mixture comprises carbon black or a carbon precursor.

4. The process as defined by claim 1, wherein the molar ratio of carbon/silica in said primary reaction mixtures ranges from 1 to 20.

5. The process as defined by claim 4, said ratio ranges from 1.5 to 8.

6. The process as defined by claim 1, wherein said primary reaction mixture comprises seed $Si_3N_4$ crystals.

7. The process as defined by claim 1, said primary reaction mixture further comprises at least one compound of Mg, Ca, Fe, Si, Ti or Zr.

8. The process as defined by claim 1, wherein said primary reaction mixture is shaped and optionally dried to form particulates thereof.

9. The process as defined by claim 1, said matrix material comprises carbon black or a carbon precursor.

10. The process as defined by claim 1, said matrix material further comprises a crystallization initiator.

11. The process as defined by claim 1, said matrix material further comprises at least one compound of Mg, Ca, Fe, Si, Ti or Zr.

12. The process as defined by claim 8, said matrix material is sprayed onto said primary reaction mixture.

13. The process as defined by claim 8, said matrix material is granulated onto said primary reaction mixture.

14. The process as defined by claim 1, comprising carbonitriding said composite under a nitrogen flowstream at a temperature ranging from 1,300° to 1,550° C.

* * * * *

UNITED STATES PATENT AND TRADEMARK OFFICE
CERTIFICATE OF CORRECTION

PATENT NO. : 5,378,666
DATED : January 3, 1995
INVENTOR(S) : Roland BACHELARD et al.

It is certified that error appears in the above-indentified patent and that said Letters Patent is hereby corrected as shown below:

Column 4, lines 63 and 65, "whiskers" should read --rods--.

Signed and Sealed this

Eleventh Day of July, 1995

*Attest:*

BRUCE LEHMAN

*Attesting Officer*      *Commissioner of Patents and Trademarks*